United States Patent
Gurumoorthy et al.

(10) Patent No.: US 6,857,058 B1
(45) Date of Patent: Feb. 15, 2005

(54) APPARATUS TO MAP PAGES OF DISPARATE SIZES AND ASSOCIATED METHODS

(75) Inventors: Nagasubramanian Gurumoorthy, Hillsboro, OR (US); Shivaprasad Sadashivaiah, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/412,077

(22) Filed: Oct. 4, 1999

(51) Int. Cl.[7] .............................................. G06F 12/10
(52) U.S. Cl. ...................... 711/209; 711/202; 711/203; 711/205; 711/206; 711/207; 711/208; 711/221; 711/170; 711/171; 711/172; 711/173
(58) Field of Search ................................. 711/202, 203, 711/205, 206, 207, 208, 209, 221, 170, 171, 172, 173

(56) References Cited

U.S. PATENT DOCUMENTS

| | | | |
|---|---|---|---|
| 4,285,040 A | | 8/1981 | Carlson et al. .............. 711/206 |
| 5,058,003 A | * | 10/1991 | White ......................... 711/209 |
| 5,129,088 A | | 7/1992 | Auslander et al. |
| 5,426,752 A | * | 6/1995 | Takahasi et al. ............. 711/209 |
| 5,475,827 A | * | 12/1995 | Lee et al. .................... 711/207 |
| 5,479,627 A | * | 12/1995 | Khalidi et al. ............... 711/205 |
| 5,542,065 A | | 7/1996 | Burkes et al. ............... 711/114 |
| 5,617,554 A | * | 4/1997 | Alpert et al. ................ 711/208 |
| 5,712,998 A | * | 1/1998 | Rosen ......................... 711/200 |
| 5,765,201 A | * | 6/1998 | Manges et al. .............. 711/201 |
| 5,784,707 A | | 7/1998 | Khalidi et al. ............... 711/206 |
| 6,041,016 A | * | 3/2000 | Freker .................... 365/230.02 |
| 6,069,638 A | | 5/2000 | Porterfield |
| 6,205,530 B1 | * | 3/2001 | Kang .......................... 711/202 |
| 6,289,431 B1 | * | 9/2001 | Bigbee et al. ............... 711/206 |
| 6,356,991 B1 | | 3/2002 | Bauman et al. ............. 711/209 |
| 6,374,341 B1 | * | 4/2002 | Nijhawan et al. ........... 711/200 |

* cited by examiner

*Primary Examiner*—B. James Peikari
(74) *Attorney, Agent, or Firm*—Schwegman, Lundberg, Woessner & Kluth, P.A.

(57) ABSTRACT

A data processing system providing high performance two-dimensional and three-dimensional graphics includes at least one system processor, chipset core logic, a graphics processor, main memory storing computer software and data including operating system software, and a graphics address remapping table (GART). The chipset logic operates on first-sized memory pages, while the operating system operates on larger, second-sized memory pages. In one embodiment GART driver software maps each second-sized page to Z first-sized pages by filling up the GART with Z entries per second-sized page, where Z is the rounded integer number of first-sized pages per second-sized page. In another embodiment, an address translation function converts a first page number, corresponding to a first-sized page, issuing from a system processor into a second page number, corresponding to a second-sized page, and a page offset within the second-sized page. Also described is an integrated circuit for mapping memory pages of disparate sizes, and a computer-readable medium storing a data structure for implementing the page mapping method and apparatus.

15 Claims, 3 Drawing Sheets

APPARATUS TO MAP PAGES OF DISPARATE SIZES AND ASSOCIATED METHODS

TECHNICAL FIELD

The inventive subject matter relates to memory systems within a data processing system and, in particular, to apparatus and associated methods to map pages of disparate sizes.

BACKGROUND INFORMATION

In the field of data processing, there is an ever increasing demand for graphics and full-motion video applications which are faster, more detailed, and generally more lifelike than their predecessors. Many of these applications are useful in commercial, educational, military, and personal data processing systems. In addition, the rapid acceleration of Internet applications is mandating high performance graphics and multimedia features in newly released computer systems.

High speed two-dimensional and three-dimensional graphics processing requires fast processing in order to provide realistic detail and to implement special effects, such as texture maps, alpha blending, and Z-buffering.

Texture maps provide life-like surfaces and shadows within a three-dimensional image. Alpha blending allows two graphics objects to be blended together. Z-buffering (or hidden surface removal) tracks the depth of objects from the perspective of the viewer to ensure that objects behind others in a scene don't appear until the viewer has them in his or her line of sight.

Since most if not all data used for graphics display, including the above-mentioned special effects, is stored in memory, current graphics computer software has a huge demand for memory bandwidth, i.e. the ability to move large amounts of data quickly throughout the data processing system.

The Accelerated Graphics Port (AGP) is a bus specification developed by Intel Corporation that enables high performance two-dimensional and three-dimensional graphics to be displayed quickly on ordinary personal computers. AGP uses the computer's main storage, also known as RAM (random access memory), to store graphics data. Graphics data can be accessed, transferred, manipulated, and processed for display by one or more processors in the data processing system, including special-purpose graphics processors.

Intel Corporation designs, manufactures, and sells chipsets to support advanced graphics functions in data processing systems. A chipset is a group of microchips designed to work and to be sold as a unit in performing one or more related functions.

An AGP chipset, in conjunction with a data processing system, such as a personal computer, achieves high performance at a reduced cost, compared with expensive graphics work stations, by utilizing main memory as if it were an extension of the graphics memory, so that significantly more storage space is available for graphics data, which permits a significant increase in realism and visual quality.

In addition, AGP-based systems allow advanced graphics data to be accessed directly from main memory during on-screen rendering rather than being first accessed from main memory and temporarily stored in the relatively smaller (and more expensive per storage size) local graphics memory, thus improving memory bandwidth and latency (i.e. the speed at which data is accessed from memory and transferred to where it is needed in the system) and lowering the overall system cost for equivalent performance.

System memory is typically organized into pages. Graphics chipsets generally prefer to access data structures such as texture maps as a contiguous block of data, rather than as fragmented pages stored here and there throughout the system memory. AGP chipsets thus are provided with core logic to translate addresses through a memory-based graphics address remapping table (GART). The GART is typically located in main memory, although it can be located in a dedicated memory. The GART and its associated GART driver can map random pages into a single, contiguous, physical address space.

An important function performed by the GART driver is to fill up the GART with page addresses. Each GART entry corresponds to a page in the main memory.

Until recently, both the chipset and the operating system supported a common page size, for example 4 kilobytes (KB). Therefore, the GART driver performed a straight-forward 1:1 mapping between chipset pages and operating system pages.

However, chipsets and operating systems being developed for future release will not necessarily support the same size page. If pages are mapped by the GART driver on a 1:1 basis, large amounts of system memory space can be wasted. For example, if each operating system page is 16 KB, and each chipset page is 4 KB, then a 1:1 mapping would waste (16 KB−4 KB=12 KB) of memory for each operating system page that is mapped by the GART driver.

For the reasons stated above, there is a substantial need in the data processing art to provide a method and apparatus for mapping pages of disparate sizes.

DETAILED DESCRIPTION

In the following detailed description, reference is made to the accompanying drawings that form a part hereof, and in which is shown by way of illustration specific embodiments in which the inventive subject matter may be practiced. Such embodiments of the inventive subject matter may be referred to, individually and/or collectively, herein by the term "invention" merely for convenience and without intending to voluntarily limit the scope of this application to any single invention or inventive concept if more than one is in fact disclosed. It is to be understood that other embodiments may be utilized and structural changes may be made without departing from the scope of the present subject matter.

Figure 1:
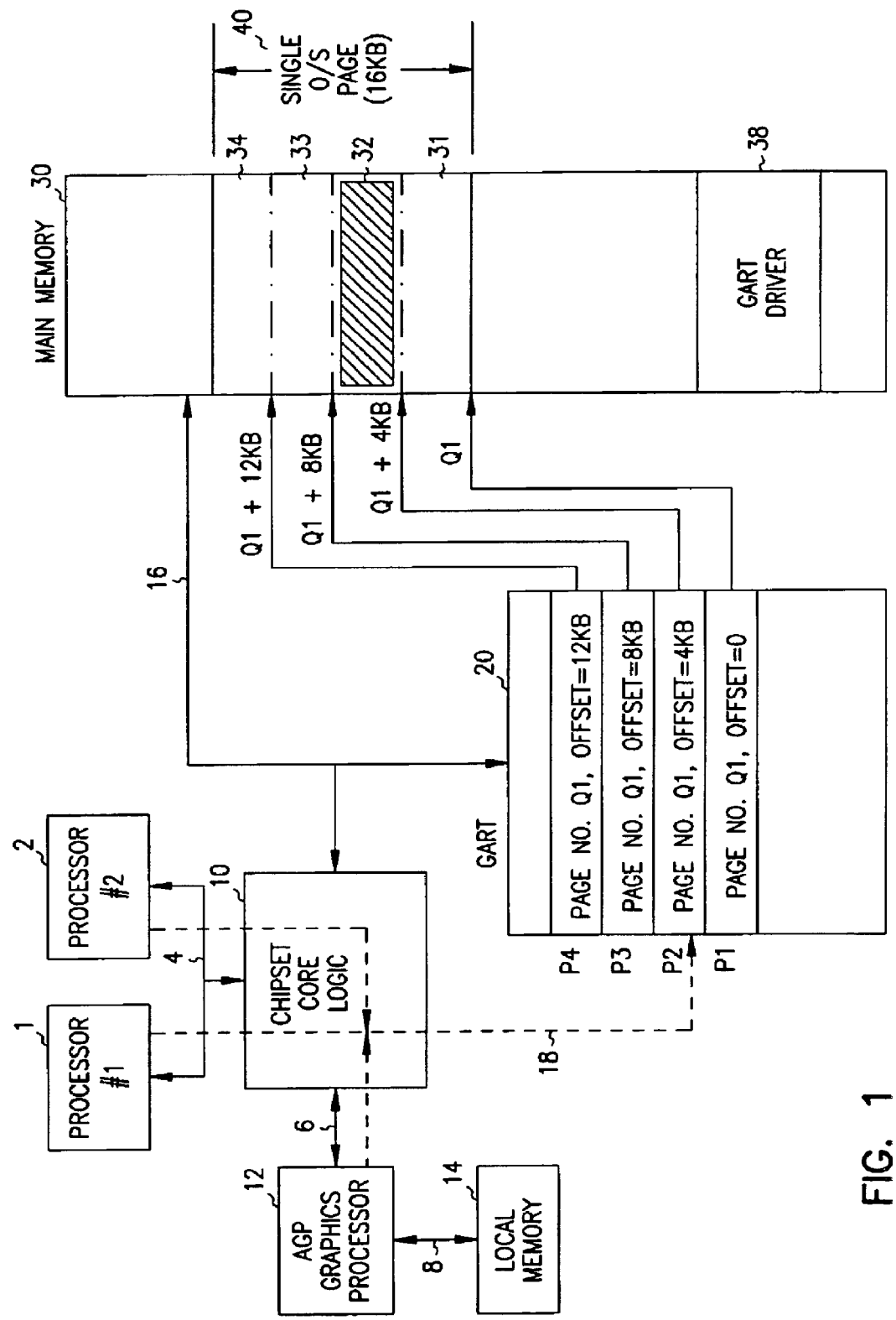
FIG. 1 illustrates a block diagram of a data processing system, including a graphics address remapping table (GART), in accordance with one embodiment of the invention.

FIG. 1 illustrates a block diagram of a data processing system, including a graphics address remapping table 20 (GART), in accordance with one embodiment of the invention. The data processing system shown in FIG. 1 is capable of performing high performance two-dimensional and three-dimensional graphics processing. In one embodiment, the system comprises system processors 1 and 2, chipset core logic 10, AGP graphics processor 12, local memory 14, GART 20, and main memory 30.

Processors 1 and 2 are coupled to each other and to chipset core logic 10 via bus 4. AGP processor is coupled to chipset core logic 10 via bus 6, and it is coupled to local memory 14 via bus 8. Chipset core logic 10 is coupled to GART 20 and to main memory 30 via bus 16.

Other user interface elements, such as a visual display, keyboard, pointing device, audio speakers, microphone, joy stick, printer, MIDI (musical instrument digital interface) keyboard, and the like can form a part of the data processing system but have not been illustrated in FIG. 1 for the sake of clarity. Likewise, additional peripheral devices, such as magnetic and optical disk drives, CD (compact disc) drives, DVD (digital versatile disc) audio and video drives, other audio and video equipment, modems, network and other I/O (input/output) interfaces, and the like can also form a part of the data processing system, but they too have been omitted from FIG. 1., because one of ordinary skill will understand how to utilize them in the broad spectrum of applications for which the data processing system can be employed.

It will be apparent to one of ordinary skill in the art that while busses such as 4, 6, 8, and 16 are shown as single lines in FIG. 1, they ordinarily will be implemented as multiple conductors. Alternatively they can be implemented in any other suitable transmission medium, such as wireless or fiber optic technology.

It will be apparent that while GART 20 is shown in a block separate from main memory 30, it is actually stored in main memory 30. However, GART 20 can also be implemented in a, separate, dedicated memory.

It will be apparent to one of ordinary skill in the art that the data processing system could include more or fewer processors than shown in FIG. 1. It will also be understood that the data processing system could function, although at a reduced level of performance, with only one system processor and/or without AGP graphics processor 12 and local memory 14.

In one embodiment system processors 1 and 2 are Intel® Pentium® III processors commercially available from Intel Corporation. The AGP graphics processor 12 is an Intel® 740 graphics accelerator commercially available from Intel Corporation. Local graphics memory 14 is part of a graphics accelerator card commercially available from Intel Corporation.

Main memory can be implemented in any suitable commercially available memory system. In one embodiment main memory is implemented with synchronous dynamic random access memory (SDRAM) devices as, for example, in an Intel® 440BX motherboard commercially available from Intel Corporation.

In one embodiment the computer software for filling and maintaining the GART is implemented as a GART driver 38 (FIG. 1) which is integrated into the Windows 64® operating system which is anticipated to be commercially available from Microsoft Corporation.

It will be apparent to one of ordinary skill in the art that the software for filling and maintaining the GART can be implemented by a different type of software module which can reside other than in the operating system and be executed by an execution unit (not shown) other than system processors 1,2.

In one embodiment address translation logic is implemented by a suitable circuit component provided in the chipset core logic 10. Chipset core logic 10 can take the form of an Intel® 82460GX chipset which is expected to be commercially available from Intel Corporation.

The 82460GX chipset is expected to include several integrated circuits. One chip is an Intel® 82460GX System Address and Control (SAC) integrated circuit which provides addressing functions. Other associated chips are a System Data Path (SDP) integrated circuit which provides data access functions, and a Graphics Expansion Bridge (GXB) integrated circuit providing AGP functions. Another chip is an Intel I/O and Firmware Bridge (IFB) integrated circuit. This integrated circuit provides a PCI (Peripheral Component Interconnect)-to-ISA (Industry Standard Architecture) bridge function, a PCI-to-IDE (Integrated Device Electronics) function, a USB (Universal Serial Bus system bus) host/hub function, and an enhanced power management function.

In another embodiment, the address translation logic can be implemented in a suitable software module that is executed by one or both processors 1 and 2 or a dedicated execution unit (not shown).

The operation of the software for filling the GART 20 will now be described.

Figure 2:
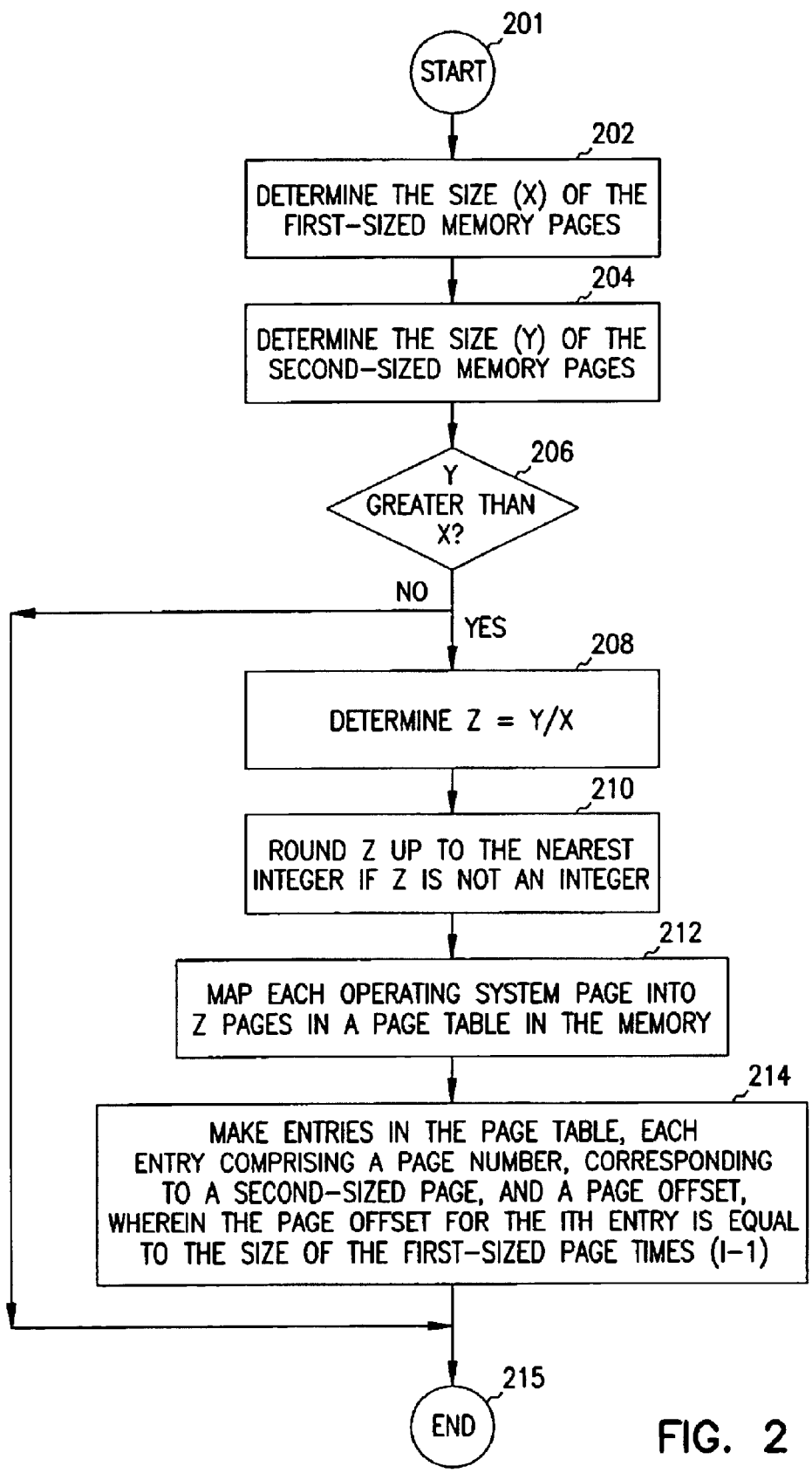
FIG. 2 illustrates a flow diagram of a method for making entries in a graphics address remapping table (GART), in accordance with one embodiment of the present invention.

FIG. 2 illustrates a flow diagram of a method for making entries in a graphics address remapping table (GART 20, FIG. 1), in accordance with one embodiment of the present invention.

In box 202 the size (X) of first-sized memory pages, e.g. those supported by the chipset core logic 10, is determined. This can be implemented by a suitable instruction in the GART driver, such as "Get Chipset Page Size".

In box 204 the size (Y) of second-sized memory pages, e.g. those supported by the operating system, is determined. This can be implemented by a suitable instruction in the GART driver, such as "Get Operating System Page Size". Both X and Y are assumed to be positive integers.

In decision box 206, X and Y are compared, and if Y is less than or equal to X, the method ends; otherwise, it proceeds to box 208, where the value (Z) of Y/X is determined.

In box 210, the value of Z is rounded up to the next higher integer if Z is not an integer. Thus Z=5.25 is rounded to 6; Z=6.99 is rounded to 7; and so forth.

In box 212, each operating system page is mapped into Z pages in a page table in memory, e.g. GART 20 in FIG. 1. This operation is further implemented in box 214, wherein entries are made in the page table.

Each page table entry comprises a page number (e.g. Page No. Q1 in FIG. 1) identifying the starting address of a second-sized page (e.g. page 40 in FIG. 1). Each page table entry further comprises a page offset, wherein the page offset for the $I^{th}$ entry is equal to the size of the first-sized page (e.g. the 4 KB pages supported by chipset core logic 10 in the example shown in FIG. 1) times the quantity (I-1). I is assumed to be a positive integer which is less than or equal to Z, i.e. the quotient of the size of the second-sized page divided by the size of the first-sized page.

The method ends in box 215.

An address translation operation involving the GART 20 (FIG. 1) will now be described.

Figure 3:
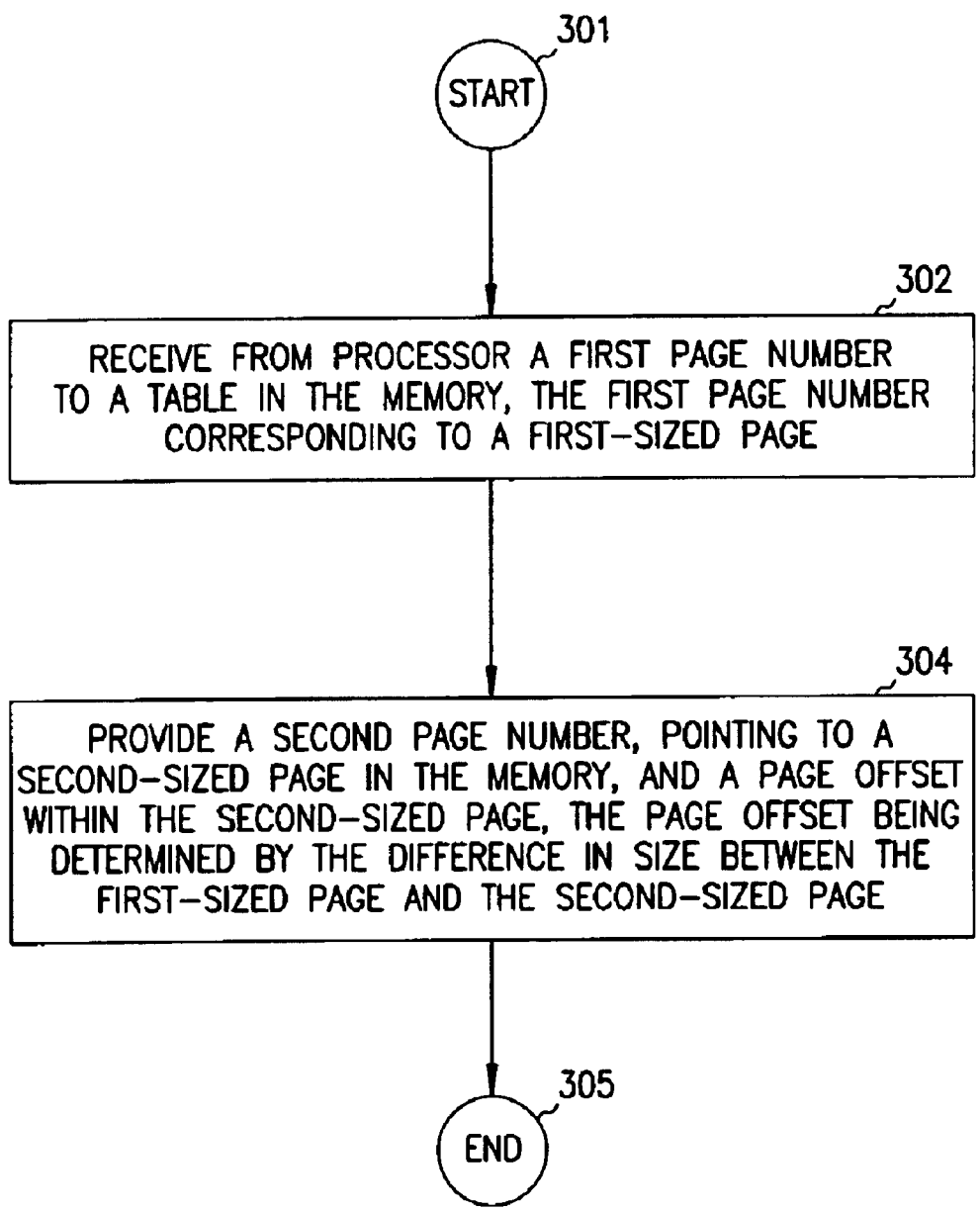
FIG. 3 illustrates a flow diagram of a method for performing an address translation using a graphics address remapping table (GART), in accordance with one embodiment of the present invention.

FIG. 3 illustrates a flow diagram of a method for performing an address translation using a graphics address remapping table (GART 20, FIG. 1), in accordance with one embodiment of the present invention.

In box 302 a first page number (e.g. P1, P2, P3, or P4 in FIG. 1) is received from a processor to a table in the memory (GART 20, FIG. 1). The first page number corresponds to a first-sized page (e.g. the 4 KB pages 31–34 supported by chipset core logic 10 in the example shown in FIG. 1).

In box 304 a second page number (e.g. Page No. Q1 in GART 20, FIG. 1) is provided by the address translator. The second page number points to the starting address of a second-sized page (e.g. a 16 KB operating system page 40 in main memory 30, FIG. 1). Also provided by the address translator is a page offset (e.g. 0, 4 KB, 8 KB, or 12 KB in GART 20, FIG. 1) within the second-sized page. The page offset is determined by the difference in size between the first-sized page and the second-sized page, as explained above with reference to FIG. 2.

A specific example of address translation involving disparate sized pages will now be discussed with reference to FIG. 1. Assume that one of processors 1, 2, or 12 desires to access a 4 KB-sized page identified by page number P2. 4 KB is the size of page which is supported by chipset core logic 10. Dashed line 18 in FIG. 1 represents this access request, which passes through chipset core logic 10. It will be understood by one of ordinary skill in the art that the actual physical connection between processors 1, 2, and 12 and GART 20 is over appropriate busses shown in FIG. 1.

In GART 20 the entry corresponding to P2 provides a second page number (Page No. Q1), pointing to the starting address Q1 of the 16 KB-sized operating system page 40 in main memory 30. The GART entry corresponding to P2 also provides a page offset=4 KB within the operating system page 40. This page offset represents the starting address of the 4 KB-sized portion 32 of operating system page 40.

In like manner, the P1, P3, and P4 entries in GART 20 also provide Page No. Q1 as the starting address of page 40. In addition the P1 entry also provides a page offset=0, representing the starting address of the 4 KB-sized portion 31 of operating system page 40. Likewise, the P3 and P4 entries provide page offsets of 8 KB and 12 KB, respectively, representing the starting addresses of the 4 KB-sized portions 33 and 34, respectively.

In one embodiment the second-sized page is $2^N$ times larger than the first-sized page, N being a positive integer, and GART 20 has $2^N$ entries for each of the second-sized pages. A first entry in the $2^N$ table entries for a specific one of the second-sized pages has an offset equal to zero, and a second entry in the $2^N$ table entries for the specific one of the second-sized pages has an offset equal to the size of the first page.

The $I^{th}$ entry in the $2^N$ table entries for the specific one of the second-sized pages has an offset equal to the size of the first page times the quantity (I-1), where I is a positive integer less than or equal to the quotient (Z) of the size of the second-sized page (Y) divided by the size of the first-sized page (X). In other words, the page offset can range from zero to the size of the first-sized page times the quantity (Z-1).

It will be apparent to one of ordinary skill in the art that other relationships between the sizes of the pages supported by various components in the data processing system can exist and be accommodated by the apparatus and methods disclosed herein.

Still with reference to FIG. 1, it will be seen that the contents of GART 20 and main memory 30 represent data structures stored in a computer-readable medium. Other types of computer-readable media (not shown), such as a magnetic or optical disc, CD ROM (read only memory), DVD, magnetic tape, flash memory card, and the like could also be used to store the data structures. The data structures comprise a first block of data (e.g. GART 20) stored in a first region of memory addresses (e.g. those for GART entries) in the medium, the first block comprising a plurality of entries each of which is addressable by an address (e.g. P1–P4) to a first-sized memory page (e.g. one of pages 31–34), each entry comprising a page address (e.g. Q1) to a second-sized memory page (e.g. page 40) and a page offset. The data structures also comprise a second block of data stored in a second region of memory addresses in the medium (e.g. in main memory), the second block comprising a plurality of second-sized memory pages.

A commercial embodiment of the methods described herein, for example in the form of the Windows® 64 operating system including a GART driver, is expected to be distributed on a computer-readable storage medium having instructions which can be performed by a data processing system.

It will be understood by those skilled in the art that the operations of the methods shown and described herein can be carried out in a different order than those described with reference to FIGS. 2 and 3.

In summary, the present disclosure provides a method and apparatus for mapping pages of disparate sizes. The method and apparatus conserve memory space and support very fast memory transfers, which are particularly useful in implementing high performance graphical and audio-visual applications in commercially competitive data processing systems.

In addition, the present disclosure provides a method and apparatus for filling a graphics address remapping table (GART) with the correct entries for mapping first-sized pages to second-sized pages, thereby conserving memory space.

Further, the present disclosure provides a method and apparatus for performing fast and efficient address translation between first-sized pages and second-sized pages.

It will be apparent those skilled in the art that the disclosed subject matter can be modified in numerous ways and can assume many embodiments other than those embodiments specifically set out and described above For example, instead of being stored in main memory the GART can be stored in a dedicated memory addressable by the AGP chipset. Alternatively, all or part (e.g. the most recently translated portion) of the GART could be stored in a cache memory which is associated with a processor or other iron execution logic circuit.

The memory page sizes supported by the chipset and operating system could be different from the examples used above. In addition, the memory page sizes supported by the chipset, the operating system, and the GART could be variable. For example, the GART could be suitably programmed by one of ordinary skill to access either a 4 KB page or a 16 KB page.

The present subject matter may be embodied in other specific forms without departing from the spirit or essential characteristics thereof. The present embodiments are therefore to be considered in all respects as illustrative and not restrictive, the scope of embodiments of the invention being indicated by the appended claims rather than by the foregoing description, and all changes which come within the meaning and range of equivalency of the claims are therefore intended to be embraced therein.

What is claimed is:

1. A method performed by a data processing system comprising a processor, a logic device, and a memory coupled to the processor and to the logic device, the logic device operating upon data organized in first-sized pages, and the memory storing an operating system in second-sized pages, the method comprising the following operations:

determining a size X of the first-sized pages;

determining a size Y of the second-sized pages;

wherein X and Y are positive integers; and comparing X and Y and, if Y is greater than X, determining Z=Y/X and mapping each operating system page into Z pages in a page table in the memory, wherein Z is not an integer, and Z is rounded up to the nearest integer.

2. The method recited in claim 1 wherein the mapping further comprises:

making entries in the page table, each entry comprising a page number, corresponding to a second-sized page, and a page offset, wherein the page offset for an $I^{th}$ entry is equal to the size of the first-sized page times (I-1), where I is a positive integer less than or equal to Z.

3. The method recited in claim 1 wherein the first two determining operations are performed in a different order.

4. The method recited in claim 1 wherein X and Y are determined by the processor executing first and second address translation instructions of a driver comprising a plurality of address translation instructions;

wherein X and Y are compared by the processor executing at least a third address translation instruction; and wherein Z is rounded up to the nearest integer by the processor executing at least a fourth address translation instruction only if Y is greater than X.

5. A data processing system comprising a processor, a logic device, and a memory coupled to the processor and to the logic device, the logic device to operate upon data organized in first-sized pages, and the memory organized in second-sized pages, the system to execute a computer program stored on a computer storage medium, the computer program comprising the following operations:

determining a size X of the first-sized pages;

determining a size Y of the second-sized pages;

wherein X and Y are positive integers; and comparing X and Y and, if Y is greater than X, determining Z=Y/X and mapping each second-sized page into Z pages in a page table in the memory, wherein Z is not an integer, and Z is rounded up to the nearest integer.

6. The system recited in claim 5, wherein the mapping further comprises:

making entries in the page table, each entry comprising a page number, corresponding to a second-sized page, and a page offset, wherein the page offset for an $I^{th}$ entry is equal to the size of the first-sized page times (I-1), where I is a positive integer less than or equal to Z.

7. The system recited in claim 5 wherein the first two determining operations are performed in a different order.

8. The data processing system recited in claim 5 wherein X and Y are determined by the processor executing first and second address translation instructions of a driver comprising a plurality of address translation instructions;

wherein X and Y are compared by the processor executing at least a third address translation instruction; and wherein Z is rounded up to the nearest integer by the processor executing at least a fourth address translation instruction only if Y is greater than X.

9. A computer-readable medium having computer-executable instructions that, when executed, result in operations being performed in a data processing system, the data processing system comprising a processor, a logic device, and a memory coupled to the processor and to the logic device, the logic device to operate upon data organized in first-sized pages, and the memory organized in second-sized pages, the operations comprising:

determining a size X of the first-sized pages;

determining a size Y of the second-sized pages;

wherein X and Y are positive integers; and comparing X and Y and, if Y is greater than X, determining Z=Y/X and mapping each second-sized page into Z pages in a page table in the memory, wherein Z is not an integer, and Z is rounded up to the nearest integer.

10. The computer-readable medium recited in claim 9 wherein the mapping further comprises:

making entries in the page table, each entry comprising a page number, corresponding to a second-sized page, and a page offset, wherein the page offset for an $I^{th}$ entry is equal to the size of the first-sized page times (I-1), where I is a positive integer less than or equal to Z.

11. The computer-readable medium recited in claim 9 wherein the first two determining operations are performed in a different order.

12. An integrated circuit for use in a data processing system comprising a processor and a memory coupled to the processor, the circuit comprising a component to map memory pages of disparate sizes, the component to determine a size X of a first-sized page, to determine a size Y of a second-sized page, wherein X and Y are positive integers, the component to determine Z=Y/X, wherein Z is not an integer and Z is rounded up to the nearest integer, the component to receive from the processor a first page number to a table in the memory, the first page number to correspond to a first-sized page, and the component to provide a second page number to point to a starting address of a second-sized page in the memory, and a page offset within the second-sized page, the page offset to range from zero to the size of the first-sized page times the quantity (Z-1).

13. The integrated circuit recited in claim 12 wherein the second-sized page is $2^N$ times larger than the first-sized page, N being a positive integer, and wherein the table has $2^N$ entries for each of the second-sized pages.

14. The integrated circuit recited in claim 13 wherein a first entry in the $2^N$ table entries for a specific one of the second-sized pages has an offset equal to zero, and wherein a second entry in the $2^N$ table entries for the specific one of the second-sized pages has an offset equal to the size of the first page.

15. The integrated circuit recited in claim 13 wherein an $I^{th}$ entry in the $2^N$ table entries for the specific one of the second-sized pages has an offset equal to the size of the first page times (I-1), where I is a positive integer less than or equal to Z.

* * * * *